United States Patent [19]

Sarrat et al.

[11] Patent Number: 4,676,102
[45] Date of Patent: Jun. 30, 1987

[54] DEVICE FOR INDICATING THE QUANTITY OF A LIQUID IN A RESERVOIR AND RESERVOIR PROVDED WITH SUCH A DEVICE

[75] Inventors: Rolland Sarrat, Cornebarrieu; José Verges, Colomiers, both of, France

[73] Assignee: Societe Nationale Industrielle et Aerospatiale, Paris, France

[21] Appl. No.: 855,445

[22] Filed: Apr. 24, 1986

[30] Foreign Application Priority Data

Apr. 29, 1985 [FR] France ................................. 85 06497

[51] Int. Cl.$^4$ ........................ G01F 23/30; G01F 23/02
[52] U.S. Cl. ........................................ 73/334; 73/305; 73/311
[58] Field of Search ................ 73/149, 290 B, 290 R, 73/305, 311, 323, 334

[56] References Cited

U.S. PATENT DOCUMENTS

| 267,856 | 11/1882 | Fennerty | 73/311 X |
| 952,356 | 3/1910 | Preston | 73/323 |
| 2,086,645 | 7/1937 | Staber | 73/290 R |
| 2,558,118 | 6/1951 | Yost | 73/305 |
| 2,706,410 | 4/1955 | Plath | 73/290 R |
| 3,456,715 | 7/1969 | Freedmon et al. | 73/290 R X |
| 3,835,709 | 9/1974 | Watson | 73/311 |

Primary Examiner—Michael J. Tokar
Assistant Examiner—Tom Noland
Attorney, Agent, or Firm—Fisher, Christen & Sabol

[57] ABSTRACT

This invention relates to a device for indicating the temporally variable quantity of a liquid contained in a reservoir or tank, whatever the indication of this reservoir with respect to the horizontal, wherein the device comprises an auxiliary recipient fast with the reservoir, which is arranged therewith in an at least partially enveloping arrangement and which contains an invariable quantity of an auxiliary liquid of which the level serves as reference for assessing, by comparison of level, the variable quantity of liquid contained at a given instant in the reservoir. The invention is more particularly applicable to the determination of the level of fuel in a tank connected to a vehicle, of the oil in a gearbox of a vehicle, etc.

8 Claims, 14 Drawing Figures

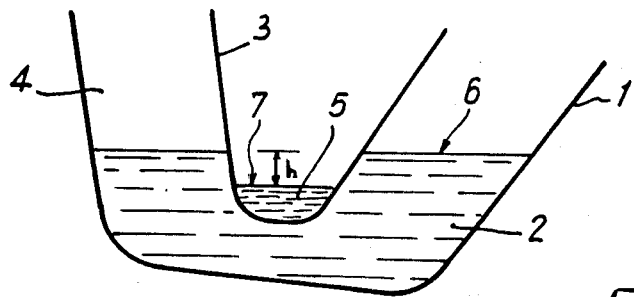
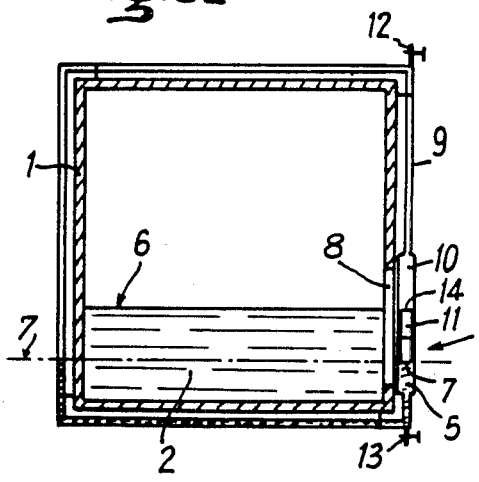
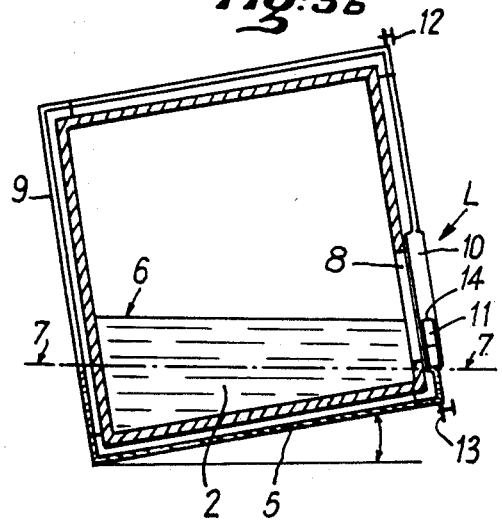
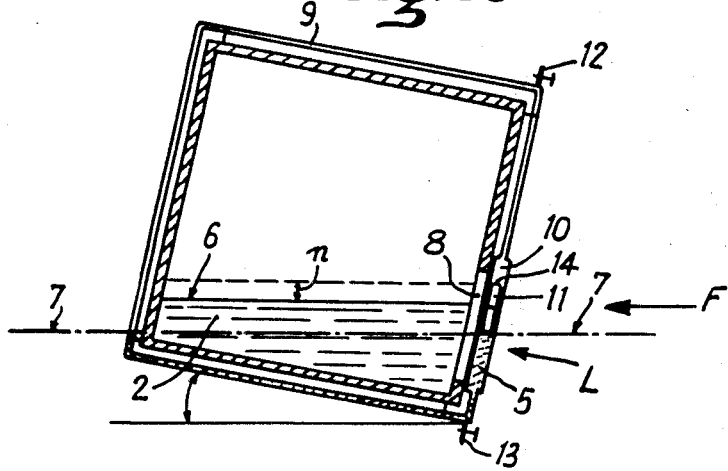

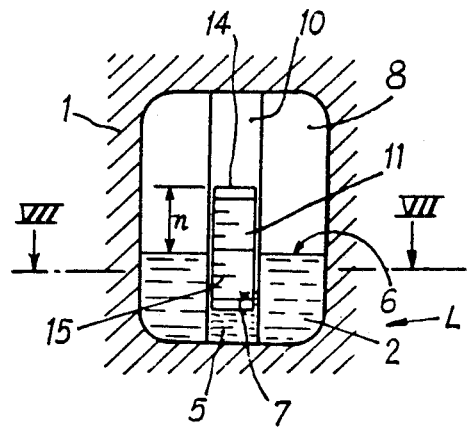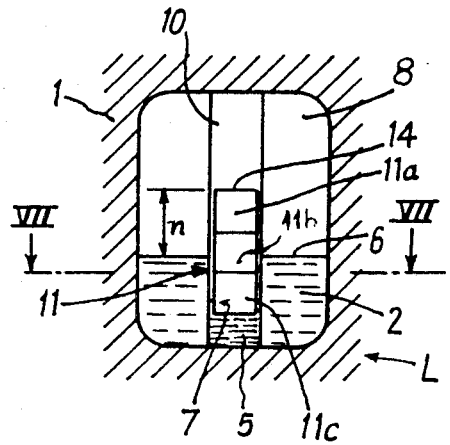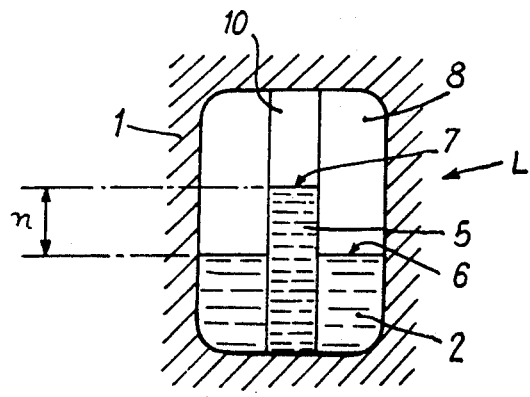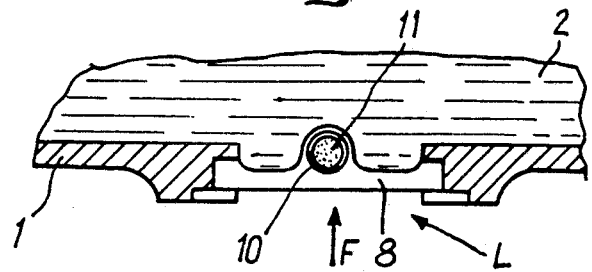

DEVICE FOR INDICATING THE QUANTITY OF A LIQUID IN A RESERVOIR AND RESERVOIR PROVDED WITH SUCH A DEVICE

BACKGROUND OF THE INVENTION

1. Field of the Invention

The present invention relates to a device for indicating the quantity of a liquid contained in a reservoir or tank, as well as to a reservoir provided with such a device.

2. Prior Art

It is more particularly, although not exclusively, applied to the case of a consumable liquid contained in a recipient connected to a vehicle, such as fuel tank or gear box, and capable of tipping with respect to a theoretical reference position, for example due to rough or non-horizontal ground or due to deformations in the suspension of said vehicle.

It is known that the quantity of a liquid contained in a reservoir or tank is generally determined from the height of the level of said liquid in the reservoir. However, for obvious reasons, the conventional simple devices, such as visual level indicators or immersed gauges, cannot be used reliably when said reservoir is subjected to inclinations with respect to the horizontal and when a precise measurement is necessary.

In tht case, it is sought to avoid variations in height of the level of the liquid with respect to the walls of the reservoir, variations due to such inclinations, by obtaining the level information near the center of the free surface of the liquid in the reservoir. In fact, at that spot, said level is normally only slightly dependent, or in any case less dependent, on the inclintion of the reservoir. However, optical, mechanical and/or electrical means must then be provided to transmit the level information to outside the reservoir. Apart from the fact that these means are generally expensive, delicate and cumbersome, it is not always possible to house them in said reservoir; this is particularly the case when said reservoir is a gearbox casing encumbered with pinion gears.

BROAD DESCRIPTION OF THE INVENTION

It is an object of the present invention to overcome these drawbacks. It makes it possible to furnish precise indications, even when the reservoir is subjected to variations in inclination, since it takes into account a difference in level of liquids and not simply the level of the liquid of which it is desired to determine the quantity.

To this end, according to the invention, the device for indicating the temporally variable quantity of a liquid contained in a reservoir, whatever the inclination of this reservoir with respect to the horizontal, is noteworthy in that it comprises an auxiliary recipient fast with said reservoir, which is arranged with the latter in an at least partially enveloping arrangement and which contains an invariable quantity of an auxiliary liquid whose level serves as reference in order to assess, by comparison of level, the variable quantity of liquid contained at a given instant in said reservoir.

The auxiliary recipient may be disposed inside said reservoir and be surrounded thereby. However, it is preferable if, conversely, the liquid of the reservoir be surrounded by said auxiliary recipient.

In this latter case, said reservoir may be of the double wall type, with the result that said auxiliary recipient is formed by the space included between the walls of said reservoir. However, in the event of the reservoir being likely to tip essentially about a principal horizontal direction, said auxiliary recipient is advantageously constituted by a tube presenting the at least approximate form of a U and of which the plane is vertical and at least substantially orthogonal to said horizontal direction of tipping.

The auxiliary recipient preferably forms a closed enclosure in order to avoid variations in quantity of the auxiliary liquid (for example by evaporation or by flow), as well as possible pollution of said auxiliary liquid.

A comparison between the reference level of the auxiliary liquid and the instantaneous level of the liquid contained in the reservoir may be effected in any appropriate manner. For example, electrical level detectors may be provided, which furnish their measurements to a comparator.

However, in a particularly simple embodiment, it is provided that the reference level of the auxiliary liquid and the instantaneous level of the liquid in the reservoir be visible, at least at adjacent spots, thus forming a reading apparatus. In this way, a simple visual comparison makes it possible to determine the quantity of liquid in the reservoir. In order to facilitate such a visual comparison, the auxiliary liquid may preferably be colored or a graduated or colored float may be provided in said auxiliary recipient. At least two such reading apparatus are advantageously provided at different spots in the reservoir, in order to facilitate reading and to allow the reservoir to be mounted in different configurations.

In particular in the case mentioned hereinabove, where said auxiliary recipient is tubular, said float may present an outer form corresponding to the inner form of said auxiliary recipient, so as to be able to be guided thereby during the variations in inclination.

In an advantageous embodiment of a reservoir provided with a tubular auxiliary recipient according to the invention, said tubular auxiliary recipient is fast with the walls of said reservoir (internally or externally thereof or said tubular device is incorporated in said walls) and said reservoir comprises a transparent window showing the level of the liquid in the reservoir and the level of the liquid in said tubular auxiliary recipient, which, to that end, is transparent at least opposite said window.

BRIEF DESCRIPTION OF THE DRAWINGS

The invention will be more readily understood on reading the following description with reference to the accompanying drawings, in which:

FIG. 2 schematically shows a variant of the device of FIG. 1.

FIGS. 3a to 3c schematically illustrate an embodiment of the invention, in three different positions of inclination.

FIGS. 4, 5 and 6 show embodiments of the reading means of the device of FIGS. 3a to 3c, viewed in the direction of arrow F of the latter Figure.

FIG. 7 is a partially enlarged view in section along line VII—VII of FIGS. 4 or 5.

DETAILED DESCRIPTION OF THE INVENTION

Figure 1A:
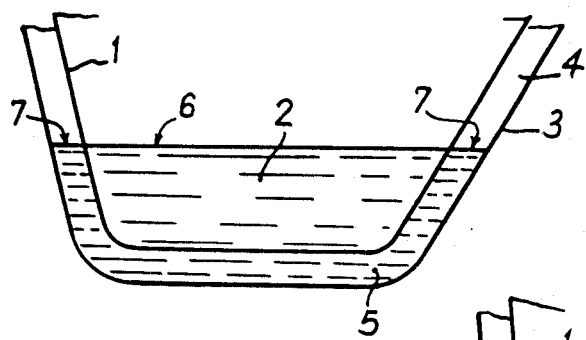
FIGS. 1a to 1d schematically illustrate the principle of the device according to the invention.

In these Figures, like reference designate like elements.

Referring now to the drawings, FIGS. 1a to 1d show a reservoir 1 containing a temporally variable quantity of a liquid 2, such as propellant, fuel, lubricating oil, etc. . . . Reservoir 1 is rendered fast with a recipient 3 surrounding said reservoir 1 externally and forming therewith an intermediate space 4 in which is contained an invariable quantity of auxiliary liquid 5. Reservoir 1 and recipient 3 form for example a double wall cavity.

FIG. 1a shows the assembly of reservoir 1 and of recipient 3 in its theoretical position with respect to the horizontal. Moreover, by way of example, FIG. 1a shows a situation for which level 6 of liquid 2 and level 7 of liquid 5 are aligned.

Figure 1B:
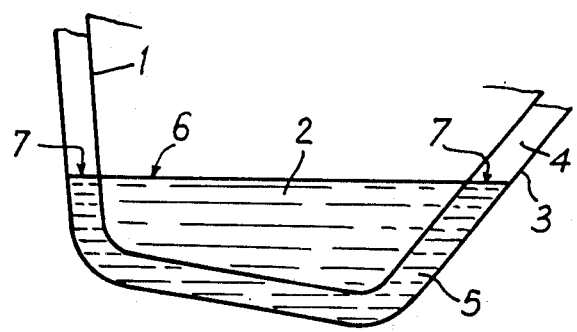

If, as shown in FIG. 1b, assembly 1–3 is tipped about one (or more) horizontal directions from the position of FIG. 1a, it goes without saying that levels 6 and 7 remain aligned.

Figure 1C:
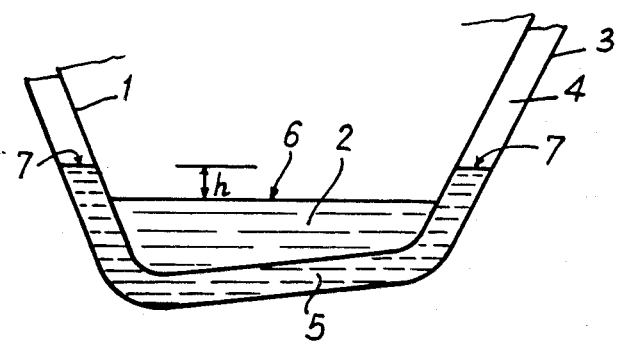
Figure 1D:
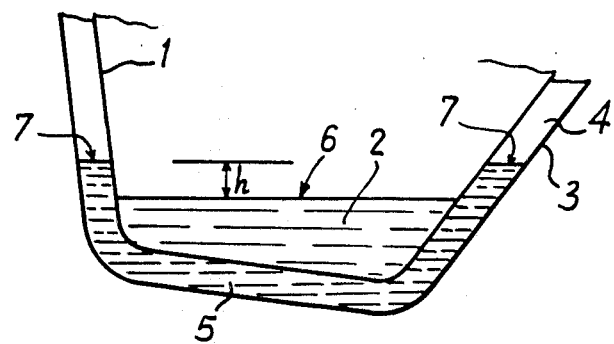

Furthermore, if, as shown in FIGS. 1c and 1d, the quantity of liquid 2 decreases (or increases) in reservoir 1, the level 6 lowers (or rises). However, since the quantity of liquid 5 is invariable, the level 7 may serve as reference. Consequently, the difference in level h between level 6 and level 7 is representative of the decrese or increase in the quantity of liquid 2 in reservoir 1. Moreover, the difference in level h is the same, at a given instant, whatever the inclination of the assembly 1–3 with respect to the horizontal (cf. FIGS. 1c and 1d).

Level 7 of liquid 5 may therefore serve as reference level in order to determine the variation in level 6 and/or to measure the quanity of liquid 2 in reservoir 1, if the capacity of said reservoir is known.

It will be noted that, to this end, it is not necessary that level 6 be initially coplanar with level 7, as shown in FIGS. 1a and 1b. However, this arrangement ia advantageous in the case of a consumable liquid 2 such as for example fuel in a tank or lubricating oil in a gearbox casing. In fact, by initially levelling level 6 of liquid 2 on level 7 of liquid 5, when filling reservoir 1, it is possible automatically and directly to know the consumption of liquid 2 by determining the difference in level h.

FIG. 2 shows a variant embodiment in which recipient 3 is inside reservoir 1, instead of surrounding it, as was the case in FIGS. 1a to 1d.

The variant embodiment of FIGS. 3a to 3c is more expecially intended for reservoirs likely to undergo inclinations about a general horizontal direction, shown as orthogonal to the plane of the drawing.

In this variant embodiment, the reservoir 1 is closed and its walls comprise a reading apparatus L provided with a transparent window 8 through which the level 6 of liquid 2 is visible. The recipient presents the form of a tube 9 forming a loop which surrounds reservoir 1 and of which at least the lower part, substantially in U-form, is transverse to said horizontal direction of tipping.

Opposite transparent window 8, tube 9 comprises a possibly widened transparent part 10, in which is guided a float 11. The liquid 5 may be introduced into tube 9, or be eliminated therefrom, thanks to connections 12 and 13.

As may be seen in FIGS. 3a to 3c, the initial level 7 of liquid 5 in tube 9 is for example adjusted so that the upper part 14 of float 11 is aligned with the initial level 6 of liquid 2. Such an alignment is valid whether reservior 1 is in its theoretical horizontal position (FIG. 3a) or in an inclined position (FIG. 3b).

As level 6 of liquid 2 lowers in the reservoir, the consumption of said liquid may be determined by examining the difference in level n between said level 6 and the upper part 14 of float 11, through window 8 and tube part 10 (FIG. 3c).

In order to facilitate such determination, float 11 may comprise several different colored zones 11a, 11b, 11c, (FIG. 5) or may be provided with graduations 15 (FIG. 4).

More simply, float 11 may be eliminated, the liquid 5 in that case being colored (FIG. 6).

The section of FIG. 7 shows that transparent window 8 forms an integral part or the walls of reservoir 1 and that part 10 of tube 9 is incorporated in said transparent window 8.

In the variant embodiment of FIGS. 3a to 3c, the device according to the invention comprises only one reading apparatus L such as for example illustrated in FIGS. 4 to 7. It may be advantageous if this device comprises more than one such reading apparatus L.

Figure 8:
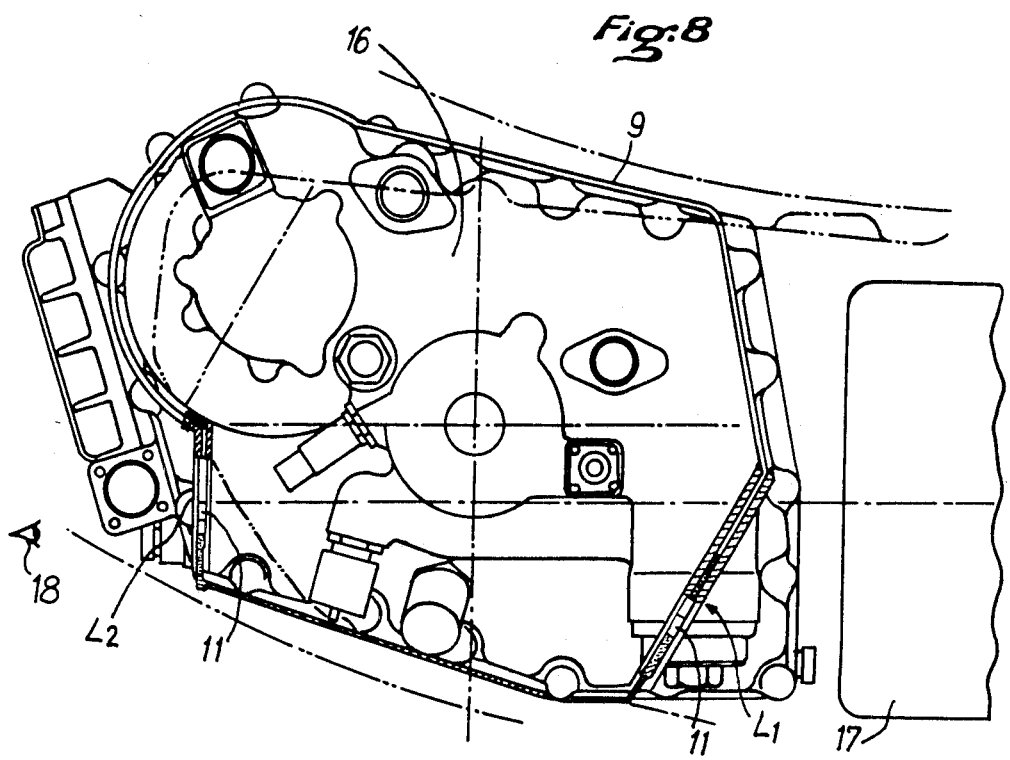
FIGS. 8 and 9 illustrate an application of the device according to the invention.
Figure 9:
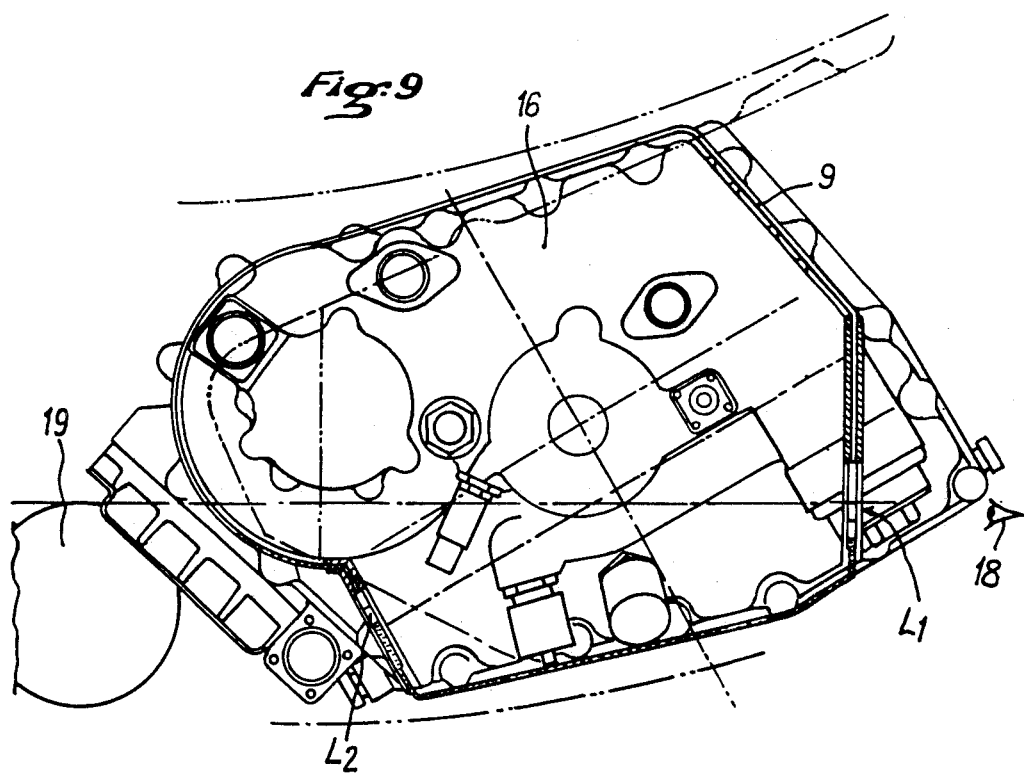

For example, FIGS. 8 and 9 show an engine 16 which, in different uses, may be mounted with different inclinations and environments. As may be seen in these FIGS. 8 and 9, engine 16 is equipped with a device according to the invention, intended for monitoring the level of the lubricating oil in said engine. This device comprises a peripheral tubular recipient 9 as described hereinabove, but two opposite reading apparatus L1 and L2, each comprising a window 10 and a float 11.

FIG. 8 shows that, in a first configuration, apparatus L1 is hidden by devices 17 so that it cannot be used. On the other hand, apparatus L2 is clear and may be examined by an observer's eye 18.

On the other hand, in the second configuration of FIG. 9, apparatus L2 is hidden by devices 19 and therefore unusable, whilst apparatus L1 is visible.

Thanks to the presence of the two apparatus L1 and L2, the engine 16 may thus be disposed in different configurations without having to modify the device according to the invention.

It will be noted that conduit 9 of the device according to the invention may be obtained either by machining the casing of engine 16, directly when casting said casing, or may be added thereto.

In this way, according to the invention, a level checking apparatus is obtained which does not comprise any moving parts (except for the possible float 11), which does not require a source of energy, whose operation is reliable and whose reading is simple, precise and without ambiguity; the auxiliary reference liquid is independent of the liquid to be monitored and is isolated from any outside contact; it is therefore not subject to deterioration and its quantity is invariable. After calibration, the connecting means 12 and 13 may be definitively obturated.

What is claimed is:

1. In a device for indicating the quantity of a liquid contained in a reservoir or tank, whatever the inclination of this reservoir with respect to the horizontal, comprising an auxiliary recipient which is fast with said reservoir and which contains an invariable quantity of an auxiliary liquid of which the level serves as reference for assessing the quantity of liquid contained at a given instant in said reservoir, the liquid in the reservoir is encircled at least partially by said auxiliary recipient; and the reference level of the auxiliary liquid and the instantaneous level of the liquid in the reservior are visible at least at adjacent spots, thus forming a level indicator.

2. The device of claim 1,
 wherein said reservoir is of a double wall type and said auxiliary recipient is formed by a space included between the double walls of said reservoir.

3. The device of claim 1, for a reservoir likely to tip essentially about a principal horizontal direction, wherein said auxiliary recipient is constituted by a tube presenting the at least approximate form of a U and of which a plane defined by the U is vertical and at least substantially transverse to said horizontal direction of tipping.

4. The device of claim 1,
 wherein said auxiliary recipient forms a closed enclosure.

5. The device of claim 1,
 wherein said reading apparatus comprises a float disposed in said auxiliary recipient and said float is guided by said auxiliary recipient in its movements consecutive to variations in inclination of the reservoir.

6. The device of claim 1,
 wherein it comprises at least two reading apparatus at different spots in said reservoir.

7. A reservoir or tank adapted to contain a liquid whose quantity may vary in time,
 wherein it comprises a device as specified in claim 1.

8. The reservoir of claim 7, comprising a device wherein said tubular auxiliary recipient is fast with the walls of said reservoir and said reservor comprises a tranparent window showing the level of liquid in the reservoir and the level of liquid in said tubular auxiliary recipient which, to that end, is transparent, at least opposite said window.

* * * * *